(12) United States Patent
Jeon et al.

(10) Patent No.: US 8,868,090 B2
(45) Date of Patent: Oct. 21, 2014

(54) METHOD AND APPARATUS FOR RECEIVING SENSING RESULTS IN A WIRELESS LAN SYSTEM

(75) Inventors: Wha Sook Jeon, Anyang-si (KR); Eun Sun Kim, Anyang-si (KR); Yong Ho Seok, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 13/580,023

(22) PCT Filed: Feb. 23, 2011

(86) PCT No.: PCT/KR2011/001203
§ 371 (c)(1),
(2), (4) Date: Aug. 20, 2012

(87) PCT Pub. No.: WO2011/105764
PCT Pub. Date: Sep. 1, 2011

(65) Prior Publication Data
US 2012/0315944 A1  Dec. 13, 2012

Related U.S. Application Data

(60) Provisional application No. 61/306,966, filed on Feb. 23, 2010.

(51) Int. Cl.
*H04W 24/00* (2009.01)
*H04W 16/14* (2009.01)
*H04L 5/00* (2006.01)
*H04W 84/12* (2009.01)

(52) U.S. Cl.
CPC .............. *H04W 16/14* (2013.01); *H04L 5/003* (2013.01); *H04W 84/12* (2013.01)
USPC ......... 455/450; 455/67.11; 370/329; 370/474

(58) Field of Classification Search
CPC ..... H04L 5/003; H04L 5/0053; H04L 1/0057; H04W 16/14; H04W 16/225; H04W 40/24; H04W 74/004; H04W 84/12

USPC ................ 455/422.1, 423, 452.1, 452.2, 464, 455/41.1, 41.2, 67.11, 67.13, 450; 370/252, 370/328, 329, 331, 474
See application file for complete search history.

(56) References Cited

U.S. PATENT DOCUMENTS 8,358,625 B2 * 1/2013 Koskinen ................ 370/331
2006/0148411 A1 * 7/2006 Cho et al. ................ 455/67.13
(Continued)

FOREIGN PATENT DOCUMENTS

KR  10-2009-0080386 A  7/2009
KR  10-2009-0092434 A  9/2009
(Continued)

OTHER PUBLICATIONS

International Search Report issued in corresponding International Patent Application No. PCT/KR2011/001203 dated Oct. 27, 2011.

*Primary Examiner* — Thanh Le
(74) *Attorney, Agent, or Firm* — Morgan, Lewis & Bockius LLP

(57) ABSTRACT

Provided are a method and apparatus for receiving sensing results in a wireless local area network (LAN). The method, with the first station serving as an unlicensed device, allowed to operate in an available channel not being used by a licensed device at a TV white space band, includes: transmitting a frame including a first element having information on a point when sensing is performed and a second element having a reporting sequence bitmap representing stations selected from a plurality of second stations to perform sensing and the sensing result report order of the selected stations to the second stations, receiving a measurement report frame, including a sensing result at the point when the sensing is performed, from each of the selected stations based on the sensing result report order, and determining, using the measurement report frame, whether the licensed device is using a channel used by the first station.

20 Claims, 13 Drawing Sheets

(56) References Cited

U.S. PATENT DOCUMENTS

| | | |
|---|---|---|
| 2009/0021545 A1 | 1/2009 | Shin |
| 2009/0186646 A1 | 7/2009 | Ahn et al. |
| 2009/0304110 A1 | 12/2009 | Choi et al. |
| 2010/0203914 A1* | 8/2010 | Shan et al. .................. 455/509 |
| 2013/0205313 A1* | 8/2013 | Kim et al. ...................... 725/14 |

FOREIGN PATENT DOCUMENTS

| | | |
|---|---|---|
| KR | 10-2009-0128304 A | 12/2009 |
| KR | 10-2010-0008211 A | 1/2010 |

* cited by examiner

FIG. 4

| Element ID | Length | SPIM Count | SPIM Frequency |
|---|---|---|---|

Octets :       1            1            2            2

FIG. 5

| Element ID | Length | Quiet Start Offset | Quiet Duration | Sensing Type | Length of RSM field(=M) | Reporting Sequence Bitmap |
|---|---|---|---|---|---|---|
| 1 | 1 | 2 | 2 | 1 | 1 | M bits |

Octets :

FIG. 6

| Category | Spectrum Management Action | Dialog Token | Measurement Report Elements |
|---|---|---|---|
| 1 | 1 | 1 | variable |

Octets:

FIG. 7

| Element ID | Length | Measurement Token | Measurement Report Mode | Measurement Type | Measurement Report |
|---|---|---|---|---|---|
| 1 | 1 | 1 | 1 | 1 | variable |

Octets:

FIG. 8

| Channel Number | Measurement Start Time | Measurement Duration | Map |
|---|---|---|---|
| 1 | 1 | 1 | 1 |

Octets :

(a) Measurement Report field format for a basic report

| Another TVWS 802.11 | ATSC | NTSC | Wireless Microphone | IEEE 802.22 | DVB | ECMA TC48-TG1 | Reserved |
|---|---|---|---|---|---|---|---|
| 0 | 1 | 2 | 3 | 4 | 5 | 6 | 7 |

Bits :

(b) Map field format

FIG. 9

| Element ID | Length |
|---|---|

Octets :  1  1

FIG. 10

| Category | Spectrum Management Action | Dialog Token | Measurement Request Elements |
|---|---|---|---|
| 1 | 1 | 1 | variable |

Octets :

FIG. 11

| Element ID | Length | Measurement Token | Measurement Report Mode | Measurement Type | Measurement Request |
|---|---|---|---|---|---|
| 1 | 1 | 1 | 1 | 1 | variable |

Octets :

METHOD AND APPARATUS FOR RECEIVING SENSING RESULTS IN A WIRELESS LAN SYSTEM

This is a U.S. National Phase Entry of PCT Application No. PCT/KR2011/001203, filed Feb. 23, 2011, and claims the benefit of U.S. Provisional Application No. 61/306,966 filed Feb. 23, 2010.

TECHNICAL FIELD

The present invention relates to a wireless LAN system, and more particularly, to a method and apparatus for receiving sensing results in a wireless LAN system.

BACKGROUND ART

The standard of the wireless local area network (WLAN) technology has been developed as the institute of electrical and electronic engineers (IEEE) 802.11 standard. The IEEE 802.11a and b use an unlicensed band at 2.4 GHz or 5 GHz, and the IEEE 802.11b provides a transmission rate of 11 Mbps while the IEEE 802.11a provides a transmission rate of 54 Mbps. The IEEE 802.11g provides a transmission rate of 54 Mbps by using orthogonal frequency division multiplexing (OFDM) at 2.4 GHz. The IEEE 802.11n provides a transmission rate of 300 Mbps for four spatial streams by using multiple input multiple output-OFDM (MIMO-OFDM). The IEEE 802.11n supports a channel bandwidth of 40 MHz, and in this case, provides a transmission rate of 600 Mbps.

The cognitive radio (CR) technology has been introduced to enhance frequency usage efficiency by using a frequency band which is not used in a specific zone at a specific time although allocated to a specific communication/broadcast service (or provider). A network that uses this CR technology will be referred to as a CR network. The CR network should not affect communication of a primary user (PU) to which a corresponding band is allocated. Accordingly, the CR network should perform in-band sensing periodically to determine whether the PU exists in a channel (in-band) currently in service. Also, if a PU signal is sensed from the channel currently in service through in-band sensing, the CR network should shift to another empty channel quickly if possible so as not to affect communication of the corresponding PU.

Currently, the IEEE 802.11af standard for defining an operation of an unlicensed device at a TV white space (TVWS) band has been developed.

The TVWS includes an ultra high frequency (UHF) band and a very high frequency (VHF) band as frequencies allocated to a broadcast TV, and means a frequency band where use of an unlicensed device is allowed on the condition that communication of a licensed device operating at the corresponding frequency band is not interrupted. A spectrum which is not used by the licensed device will be referred to as white space, and may be used by the unlicensed device. Examples of the licensed device may include devices of a system used by a licensed mode at a corresponding band, such as TV and wireless mike. The licensed device may be referred to as an incumbent user or a primary user. The unlicensed device is operated on the condition that it protects the licensed device.

The operations of all the unlicensed devices except for several special devices are allowed at 512~608 MHz and 614~698 MHz. However, communication between fixed devices is only allowed at 54~60 MHz, 76~88 MHz, 174~216 MHz and 470~512 MHz. The fixed device means a device that performs signal transmission at a given place only. An IEEE 802.11 TVWS user equipment means an unlicensed device operated using IEEE 802.11 media access control (MAC) layer and a physical layer (PHY) at a TVWS spectrum.

An unlicensed device which desires to use TVWS should provide a protection function for a licensed device. Accordingly, the unlicensed device should necessarily check whether the licensed device occupies a corresponding band, before starting to transmit a signal at the TVWS.

To this end, the unlicensed device may perform spectrum sensing to check whether the corresponding band is used by the licensed device. Examples of a spectrum sensing mechanism include an energy detection mechanism and a feature detection mechanism. The unlicensed device may determine that the licensed device is using a specific channel, if signal strength received from the specific channel is more than a given value, or if a DTV preamble is detected. And, if it is determined that the licensed device is being used at a channel directly adjoining a channel currently in service, the unlicensed device should lower a transmission power.

In this respect, the CR system should be designed such that in-band sensing may be performed efficiently.

DISCLOSURE

Technical Problem

As described above, since STA operated as an unlicensed device within a TVWS band should be operated using an available channel only to protect a licensed device, it should perform sensing efficiently to report a sensing result to an access point (AP).

An object of the present invention is to provide a channel structure allowing in-band sensing to be efficiently performed at TVWS.

Another object of the present invention is to provide a method and apparatus for reporting a sensing result to allow an AP to efficiently receive the sensing result from STA operated as an unlicensed device at TVWS.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, in a method for receiving sensing results through a first station (STA) in a wireless local area network (LAN) system, the first station serving as an unlicensed device, which is allowed to operate in an available channel not being used by a licensed device at a TV white space (TVWS) band, the method comprises the steps of transmitting a frame including a first element having information on a point when sensing is performed and a second element having a reporting sequence bitmap (RSM) that represents stations selected from a plurality of second stations to perform sensing and the sensing result report order of the selected stations to the plurality of second stations; receiving a measurement report frame, which includes a sensing result at the point when the sensing is performed, from each of the selected stations in accordance with the sensing result report order; and determining, using the measurement report frame, whether or not the licensed device is using a channel being used by the first station.

In this case, the first station may transmit a measurement request frame to the plurality of second stations to request additional sensing if it is difficult to determine whether the licensed device is using the channel used by the first station, by using the measurement report frame.

Also, the measurement request frame may include a measurement type field indicating a type of measurement request through the measurement request frame, and the measurement type field may be set to a value indicating that the measurement request frame is to request additional sensing.

Also, the first station may allocate a reporting sequence bitmap index (RSM index) to each of the plurality of second stations, and each of the second stations may perform sensing if a bit corresponding to its reporting sequence bitmap index of the reporting sequence bitmap is set to 1.

Also, the first station may transmit a frame indicating that a data period starts, to the plurality of second stations, if it is determined that the channel used by the first station is not used by the licensed device.

Also, the first station may transmit a frame indicating that the channel used by the first station should be shifted to another channel, to the plurality of second stations, if it is determined that the channel used by the first station is used by the licensed device.

Also, the measurement report frame may include information on a type of a signal which is detected.

Also, the first element may further include information on a sensing period which is a time interval for performing sensing.

Also, the sensing period may be determined by the first station depending on a status of a network.

Also, the first station may receive information as to whether sensing will be performed regardless of a listen interval from some of the plurality of second stations, which are operating in a power save mode, and select stations of the plurality of second stations, which will perform sensing, by considering the received information.

To solve the aforementioned technical problems, according to another aspect of the present invention, in a first station (STA) in a wireless local area network (LAN) system, the first station serving as an unlicensed device, which is allowed to operate in an available channel not being used by a licensed device at a TV white space (TVWS) band, the first station comprises a transmission module transmitting a frame including a first element having information on a point when sensing is performed and a second element having a reporting sequence bitmap (RSM) that represents stations selected from a plurality of second stations to perform sensing and the sensing result report order of the selected stations to the plurality of second stations; a reception module receiving a measurement report frame, which includes a sensing result at the point when the sensing is performed, from each of the selected stations in accordance with the sensing result report order; and a processor determining, using the measurement report frame, whether or not the licensed device is using a channel being used by the first station.

Advantageous Effects

According to the embodiments of the present invention, in-band sensing and in-band sensing result report can be performed efficiently.

BRIEF DESCRIPTION OF THE DRAWINGS

FIG. 4 is a diagram illustrating a sensing period indication message (SPIM) element according to the embodiment of the present invention;

FIG. 5 is a diagram illustrating a quiet element according to the embodiment of the present invention;

FIG. 6 is a diagram illustrating a format of a measurement report frame;

FIG. 7 is a diagram illustrating measurement request elements;

FIG. 8 is a diagram illustrating a format a measurement report field when a measurement type field represents a basic report;

FIG. 9 is a diagram illustrating a format of a data period start element;

FIG. 10 is a diagram illustrating a format of a measurement request frame;

FIG. 11 is a diagram illustrating measurement request elements;

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

First of all, a general configuration of a wireless LAN system will be described with reference to FIG. 1 and FIG. 2.

Figure 1:
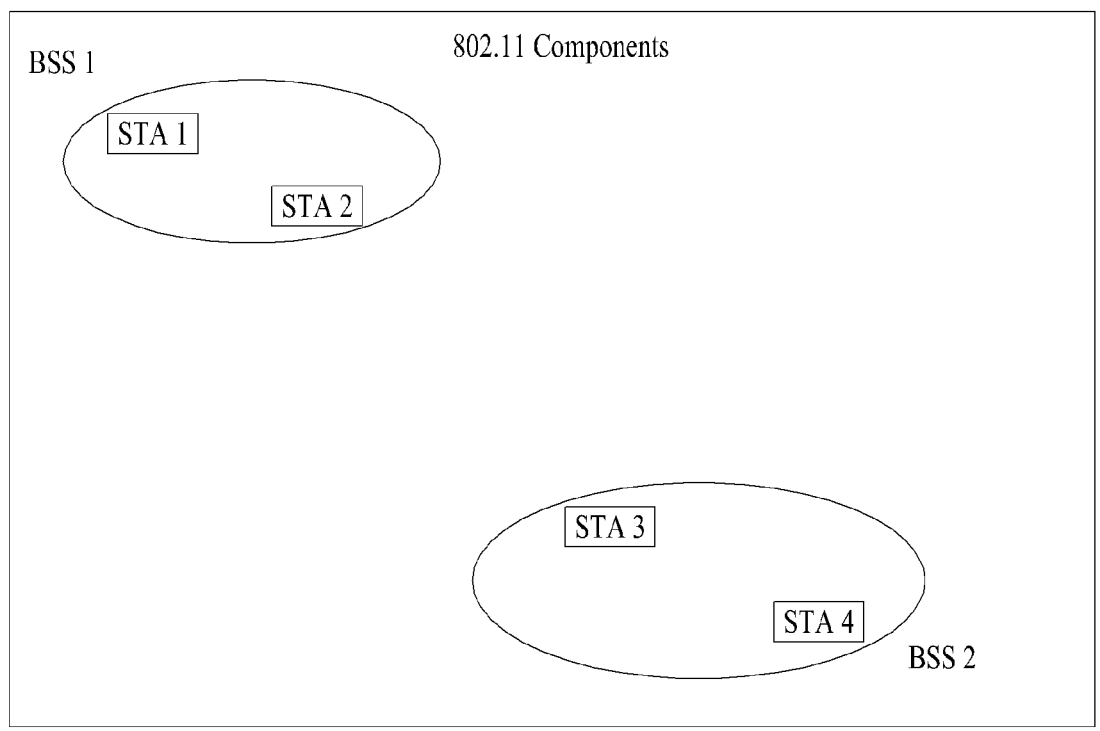
FIG. 1 is a diagram illustrating an example of a wireless LAN system.

FIG. 1 is a diagram illustrating an example of a wireless LAN system.

As shown in FIG. 1, the wireless LAN system includes one or more basic service sets (BSS). The BSS is a set of stations (STA) that may perform communication with one another through successful synchronization.

The STA is a logical entity that includes a physical layer interface for a radio medium and medium access control (MAC), and includes an access point (AP) and a non-AP station (STA). In the STA, a portable terminal manipulated by a user is a non-AP STA. The non-AP STA may simply be referred to as STA. The non-AP STA may be referred to as a terminal, a wireless transmit/receive unit (WTRU), a user equipment (UE), a mobile station (MS), a mobile terminal (MT), or a mobile subscriber unit.

The AP is an entity that provides its associated STA with access to a distribution system (DS) through a radio medium. The AP may be referred to as a concentrated controller, a base station (BS), a Node-B, a base transceiver system (BTS), or a site controller.

The BSS may be divided into an infrastructure BSS and an independent BSS (IBSS).

The BSS shown in FIG. 1 is the IBSS. The IBSS means the BSS that does not include the AP. Since the IBSS does not include the AP, access to the DS is not allowed, whereby a self-contained network is configured.

Figure 2:
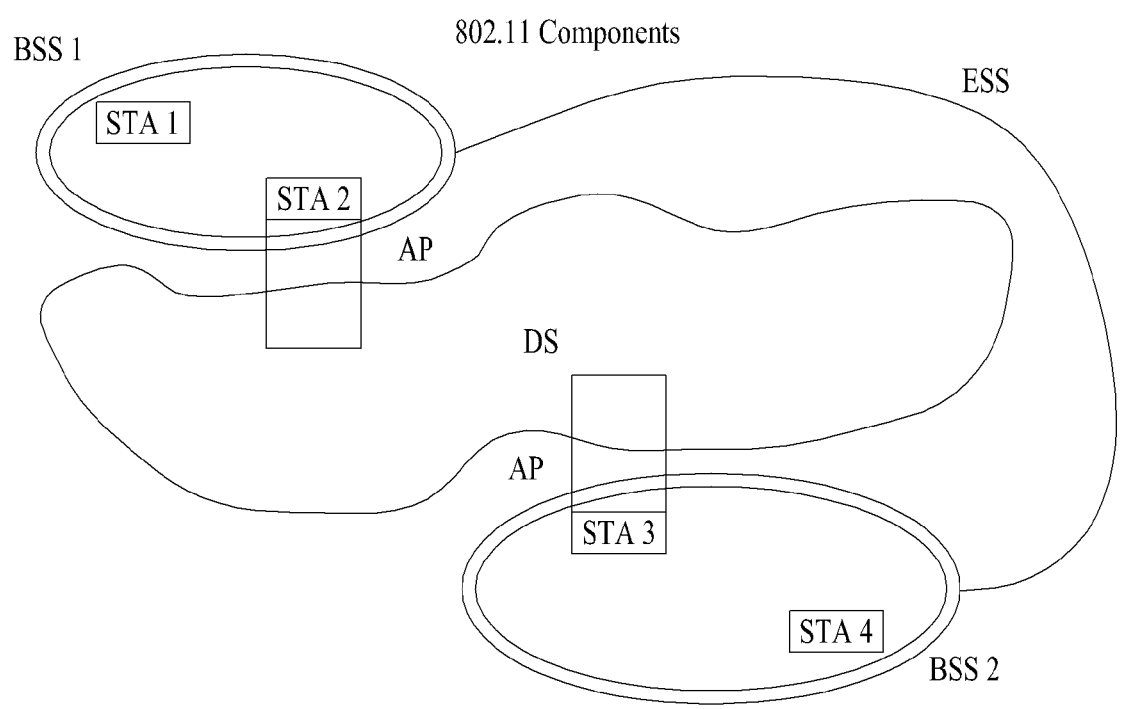
FIG. 2 is a diagram illustrating another example of a wireless LAN system.

FIG. 2 is a diagram illustrating another example of a wireless LAN system.

The BSS shown in FIG. 2 is the infrastructure BSS. The infrastructure BBS includes one or more STAs and APs. In the infrastructure BBS, communication between the non-AP STAs is basically performed through the AP. However, in the case that a direct link is configured between the non-AP STAs, direct communication may be performed between the non-AP STAs.

As shown in FIG. 2, a plurality of infrastructure BSS may mutually be connected with one another through the DS. The plurality of BSS mutually connected through the DS will be referred to as an extended service set (ESS). The STAs included in the ESS may perform communication with one another, and the non-AP STAs within the same ESS may shift from one BSS to another BSS while performing seamless communication.

The DS is a mechanism that connects a plurality of APs with one another, and may not be a network. If the DS provides a predetermined distribution service, there is no limitation in its types. For example, the DS may be a wireless network such as a mesh network, or may be a physical structure that connects the APs with one another.

Next, a sensing report method in the wireless LAN system according to the embodiment of the present invention will be described with reference to the drawings. In the embodiment of the present invention, in-band sensing will be described exemplarily. However, the present invention is not limited to in-band sensing, and may be applied to other sensing in addition to in-band sensing.

Figure 3:
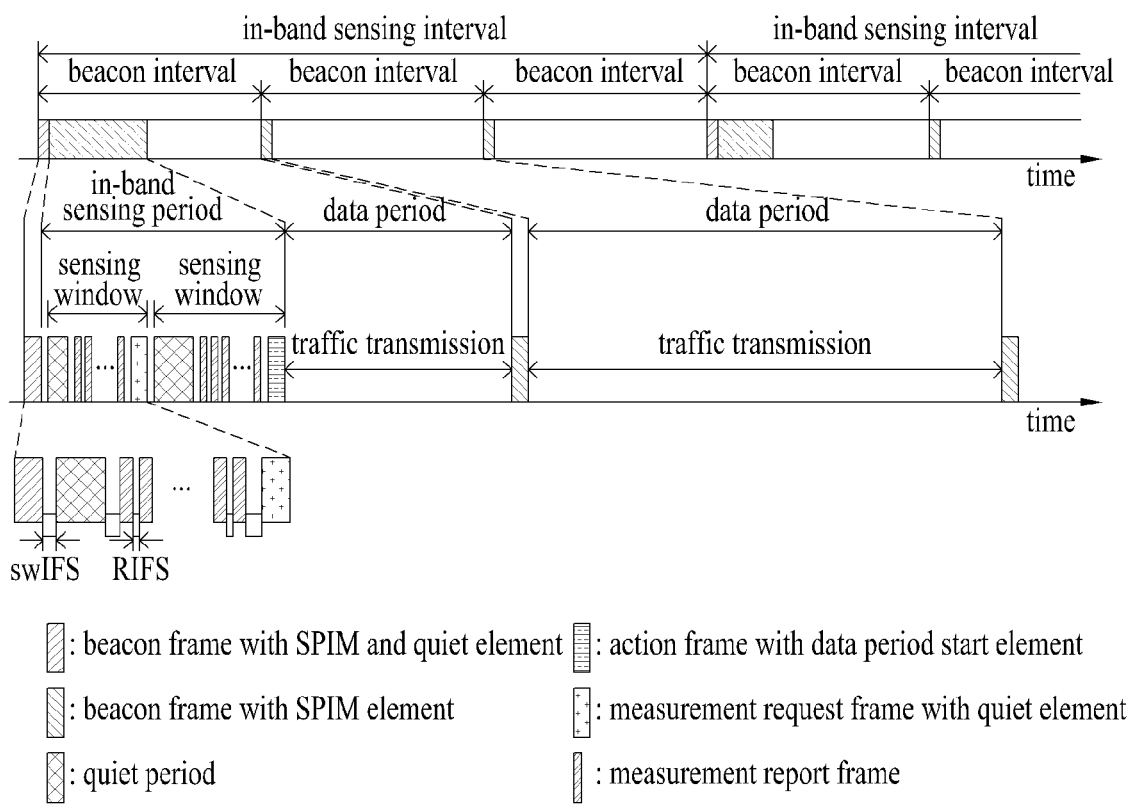
FIG. 3 is a diagram illustrating a channel structure of a CR system according to the embodiment of the present invention.

In a cognitive radio (CR) system, in-band sensing should be repeated periodically. Accordingly, a channel structure of the CR system should be designed to include a time period for in-band sensing. In order to detect a primary user (PU) more exactly, the CR systems stop signal transmission and reception of all the stations (STA) therein while in-band sensing is being performed. The time period when signal transmission and reception is stopped and in-band sensing is only performed will be referred to as a quiet period (QP). In order to sense the presence of the PU quickly and exactly, the CR system needs to arrange the QP periodically. The embodiment of the present invention suggests a channel structure shown in FIG. 3 for a BSS mode where an access point (AP) exists. FIG. 3 is a diagram illustrating a channel structure of a CR system according to the embodiment of the present invention.

According to the FCC rule, a CR system that does not acquire information on an available channel from a database should perform in-band sensing at a period of 60 seconds or less. In order to satisfy this requirement, the 802.11 TVWS system needs to perform in-band sensing at a period of several beacon intervals to several tens of beacon intervals. To this end, a beacon frame includes a sensing period indication message (SPIM) element.

FIG. 4 is a diagram illustrating SPIM element according to the embodiment of the present invention. The AP broadcasts SPIM element, which includes information on the time when in-band sensing is performed, through the beacon frame per start of the beacon intervals and notifies the STAs of the beacon interval where in-band sensing is performed.

As shown in FIG. 4, the SPIM element includes an element ID field, a length field, an SPIM count field, and an SPIM frequency field. The element ID field represents that the corresponding element is the SPIM element, and the Length field represents a length of the corresponding element.

The SPIM count field represents the number of beacons remaining to reach the beacon interval where in-band sensing is performed. If the SPIM count field is set to 0, in-band sensing is performed at the current beacon interval.

The SPIM frequency field represents a period of in-band sensing in a unit of beacon interval. If the SPIM frequency field is set to 1, in-band sensing is performed at all the beacon intervals. The AP may appropriately change the period of in-band sensing in accordance with a type of the PU or the network status during network management.

The STAs that have received the SPIM element checks whether the SPIM count field is set to 0, and performs in-band sensing in accordance with the quiet element included in the beacon frame if the SPIM count field is set to 0.

If in-band sensing is performed at the current beacon interval (that is, if the SPIM count field is set to 0), the beacon frame additionally includes a quiet element for in-band sensing. The quiet element includes a start time and length of the QP, and sensing related information such as a type of sensing which will be performed for the QP. Also, the quiet element includes STAs selected to perform sensing and report the sensing result, and a reporting sequence bitmap (RSM) for reporting a report order of the sensing result of the selected STAs.

FIG. 5 is a diagram illustrating a quiet element according to the embodiment of the present invention.

As shown in FIG. 5, the quiet element includes an element ID field, a length field, a quiet start offset field, a quiet duration field, a sensing type field, a length of RSM field, and a reporting sequence bitmap field. The element ID field represents that the corresponding element is the quiet element, and the length field represents the length of the corresponding element.

The quiet start offset field represents a time interval from a target beacon transmission time (TBTT) of the current beacon interval to a start timing of the QP in a time unit (TU). At this time, the TU may be the same as that defined in the IEEE 802.11 standard. The quiet duration field represents the length of the QP in a TU.

The sensing type field represents a type of sensing which will be performed for the QP. Table 1 illustrates an example of a sensing type.

TABLE 1

| Name | Sensing type |
|---|---|
| Energy detection | 0 |
| Feature detection | 1 |
| Reserved | 2-255 |

If the sensing type is the same as shown in Table 1, the AP sets the sensing type field to 0 to command the STAs to perform energy detection, and sets the sensing type field to 1 to command the STAs to perform feature detection.

The length of RSM field represents a length of the reporting sequence bitmap field, and the reporting sequence bitmap field represents STAs selected to perform sensing and report the sensing result, and the report order of the sensing result of the selected STAs.

According to the embodiment of the present invention, when the STA is associated with the AP, the AP allocates a reporting sequence bitmap index (RSM index) to the STA. In the IEEE 802.11 system, the STA is allocated with association ID (AID) through an association response frame when it is associated with the AP.

When the AP allocates the AID to the STA, it may allocate the RSM index together with the AID. The STA may know its bit position within the reporting sequence bitmap field by using the allocated RSM index.

Table 2 illustrates a format of the associated response frame.

TABLE 2

| Order | Information |
| --- | --- |
| 1 | Capability information |
| 2 | Status code |
| 3 | Association ID |
| 4 | Supported rates |
| 5 | RSM index |

The AP allocates the RSM index to the STA in the order of the lowest number like the association order requested by the STA during network initiation. If a specific STA requests disassociation, the AP releases allocation of the RSM index allocated to the specific STA. And, the AP again allocates the RSM index of which allocation has been released, to the STA that has requested association, whereby the length of the reporting sequence bitmap field is prevented from being more increased than the number of STAs associated with the AP.

The STAs that have received the quiet element check from the reporting sequence bitmap field whether a bit corresponding to their RSM index is 1. The STAs of which bit corresponding to their RSM index is 1 measure a channel for the QP indicated by the quiet start offset field and the quiet duration field and stores the measured result in a measurement report frame, and then transmits the measured result to the AP in the order of the lowest RSM index without contention.

As shown in FIG. 3, the first measurement report frame is received after sensing window inter frame spacing (SWIFS) from the QP. An interval between two continuous measurement report frames is the reporting IFS (RIFS). A value of the SWIFS is set to be smaller than distributed IFS (DIFS), so that measurement reporting may naturally be performed immediately after the QP, that is, measurement reporting may not be interrupted by data transmission. The value of RIFS may have the same value as that of SIFS in the existing 802.11.

FIG. 6 is a diagram illustrating a format of a measurement report frame. As shown in FIG. 6, the measurement report frame includes a category field, a spectrum management action field, a dialog token field, and a measurement report elements field.

The spectrum management action field represents whether the corresponding frame is a measurement request frame or a measurement report frame. For example, if the spectrum management action field is set to 0, it represents that the corresponding frame is the measurement request frame. If the spectrum management action field is set to 1, it represents that the corresponding frame is the measurement report frame.

The dialog token field is a value representing a corresponding measurement request frame, and is set to a value of the dialog token field of the corresponding measurement request frame.

FIG. 7 is a diagram illustrating measurement request elements.

As shown in FIG. 7, the measurement request elements include an element ID field, a length field, a measurement token field, a measurement report mode field, a measurement type field, and a measurement report field.

The measurement type field represents a type of measurement report. The measurement report field may have different types based on a value of the measurement type field. FIG. 8 is a diagram illustrating a format a measurement report field when a measurement type field represents a basic report.

As shown in FIG. 8, the measurement report field includes a channel number field, a measurement start time filed, a measurement duration field, and a map field.

The channel number represents a number of a channel to which a corresponding measurement report is applied. The measurement start time field represents the time when measurement starts, and the measurement duration field represents the time when measurement is performed. The map field is shown in FIG. 8(*b*).

Considering that various CR systems based on TVWS are currently under the standardization, the 802.11 CR system may detect a signal of another CR system as well as a PU on a channel used during sensing. Accordingly, even though the STA senses a signal on the channel for the QP, since the sensed signal may not be the PU signal, the CR system should identify a source of the signal as well as the presence of the signal. And, the CR system should report the identified signal source to the AP. In other words, the CR system should identify the type of the detected signal and report the type of the detected signal to the AP. Accordingly, each bit of the map filed is set to 1 if the corresponding signal is detected, and is set to 0 if the corresponding signal is not detected.

The AP determines whether the channel used by the AP is being used by the PU by collecting the measurement result reports received from the STAs.

If the AP determines that the channel used by the AP is not being used by the PU, it transmits an action frame, which includes a data period start element, to the STAs and indicates a start of the data period.

Figure 9:
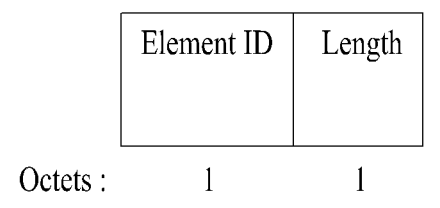

FIG. 9 is a diagram illustrating a format of a data period start element. As shown in FIG. 9, the data period start element includes an element ID field and a length field. The element ID field represents that the corresponding element is the data period start element.

If the AP determines that the current channel is being used by the PU, it transmits an action frame, which includes a channel switching announcement element, to the STAs to command the STAs to shift to another channel.

If the AP has a difficulty in determining whether the current channel is being used by the PU, through the sensing result received from the STAs, it transmits the measurement request frame, which includes a quiet element, to the STAs to command them to perform additional sensing. However, repetition of such sensing is allowed within the range that one beacon interval is not exceeded. FIG. 3 illustrates an example of in-band sensing of two times performed for one beacon interval.

In order to improve service quality of the CR system, it is preferable to reduce the QP if possible. To this end, the IEEE 802.22 system uses two-stage channel sensing such as fast sensing and fine sensing. The fast sensing is a sensing method for checking the presence of a signal, and has a short sensing time of several hundreds of—s or several ms. The fine sensing has a sensing time of several tens of ms, which is longer than that of the fast sensing, and is a sensing method for checking accurate information such as a type of a signal (that is, a type of PU). At the two-stage channel sensing, the fast sensing is first performed using a short QP. If it is determined that a signal exists, through the fast sensing, the fine sensing is performed using a long QP to identify whether the signal is a signal of the PU. After continuous fast sensing of two times is performed, the fine sensing may be performed. Supposing that the 802.11 TVWS system follows two-stage channel sensing, a length (generally, 100 ms) of one beacon interval is the time sufficient to exactly identify the PU.

FIG. 10 is a diagram illustrating a format of a measurement request frame.

As shown in FIG. 10, the measurement request frame includes a Category field, a Spectrum Management Action field, a Dialog Token field, and a Measurement Request Elements field. The Spectrum Management Action field represents whether the corresponding frame is the measurement request frame or the measurement report frame. For example, if the Spectrum Management Action field is set to 0, it may represent that the corresponding frame is the measurement request frame. If the Spectrum Management Action field is set to 1, it may represent that the corresponding frame is the measurement report frame.

The Dialog Token field is a value not 0 selected by the STA, which transmits the measurement request frame, and is a value for identifying measurement request and transaction.

FIG. 11 is a diagram illustrating measurement request elements.

As shown in FIG. 11, the Measurement Request Elements include an Element ID field, a Length field, a Measurement Token field, a Measurement Request Mode field, a Measurement Type field, and a Measurement Request field.

The Measurement Type field represents a type of measurement request. Table 3 illustrates an example of a value of the Measurement Type field. If the value of the Measurement Type field is the same as shown in Table 3, it is difficult for the AP to determine whether the channel used by the AP is being used by the PU, from the measurement result report received from the STAs. Accordingly, the measurement type field of the Measurement Request Elements transmitted to request the STAs of additional sensing is set to 3.

TABLE 3

| Name | Measurement type |
|---|---|
| Basic request | 0 |
| Clear channel assessment (CCA) request | 1 |
| Receive power indication (RPI) histogram request | 2 |
| Additional in-band sensing request | 3 |
| Reserved | 4-255 |

Referring to FIG. 3 again, if in-band sensing is not performed at the current beacon interval (that is, when the SPIM count is not 0), the data period starts directly. The STA may know a data period end time (that is, target beacon transmission time (TBTT) through a timestamp field and a beacon interval field within the received beacon frame. In FIG. 3, the data period may correspond to the beacon interval at the existing IEEE 802.11 power save mode. The channel structure suggested in the embodiment of the present invention does not affect the operation related to a traffic indication map (TIM) and a delivery traffic indication message (DTIM) of the existing IEEE 802.11 system.

Since a signal detection radius is small in case of a low power PU such as a wireless mike, it is likely that only some STAs in the 802.11 TVWS system may detect the signal even though the wireless mike is operated at the corresponding channel. Accordingly, in order to protect the lower power PU, the STA (PS STA) operating at the power save mode should take part in in-band sensing regardless of listen interval. However, it is not preferable that PS STA of which remaining battery amount is very small wakes up for an in-band sensing period regardless of its listen interval. Accordingly, it is required to allow the PS STA to select whether the PS STA wakes up for the in-band sensing period unconditionally or in accordance with its listen interval regardless of the in-band sensing period.

The PS STA that has determined to unconditionally wake up for the in-band sensing period may notify the AP of two manners as follows. One of the two manners is that PS and sensing bit of a capability information field within an association request frame is set to 1 when the PS STA is associated with the AP. The other one is that PS and sensing bit of a capability information field within a re-association request frame is set to 1 during normal operation and transmitted to the AP. The AP may know whether each STA may take part in in-band sensing of a specific beacon interval, through the listen interval and PS and sensing bit of the STAs. Accordingly, the AP selects STAs, which will take part in in-band sensing, and transmits information on the selected STAs by containing the same in the quiet element.

Figure 12:
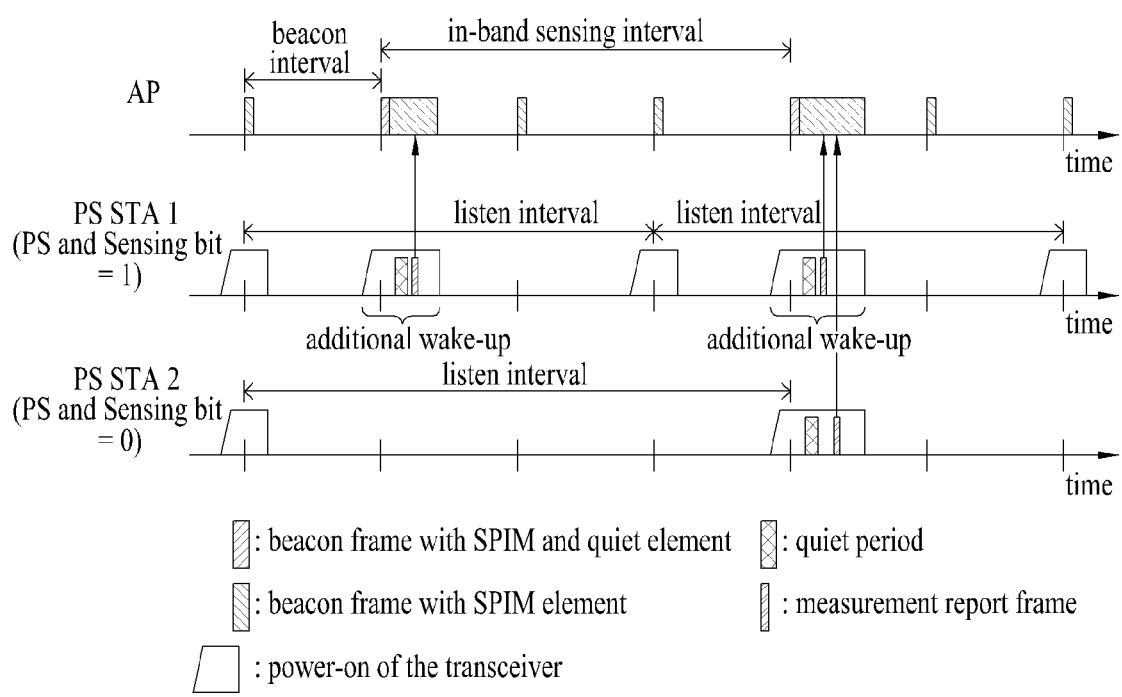
FIG. 12 is a diagram illustrating an operation example of PS STA based on PS and sensing bit.

FIG. 12 is a diagram illustrating an operation example of PS STA based on PS and sensing bit. In FIG. 12, since PS and sensing bit of PS STA1 is 1, the PS STA1 wakes up in accordance with its listen interval and takes part in sensing by unconditionally waking up for the in-band sensing period even the listen interval does not pass. Since PS and sensing bit of PS STA2 is 0, the PS STA2 wakes up in accordance with its listen interval only. Accordingly, as shown in FIG. 12, since the PS STA2 is in a sleep mode for the first in-band sensing period, it does not wake up. When the PS STA2 wakes up in accordance with passage of the listen interval, it performs in-band sensing if the corresponding period corresponds to the in-band sensing period.

Figure 13:
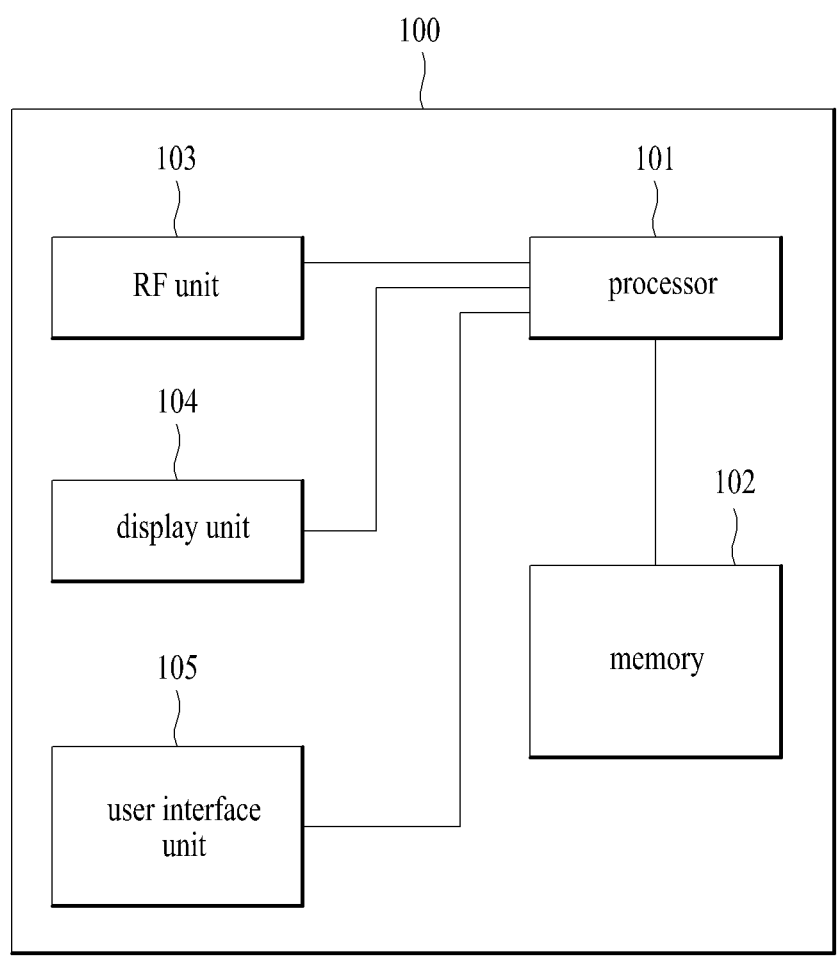
FIG. 13 is a block diagram illustrating a device that may be applied to station (STA) or access point (AP) and that may perform the present invention.

FIG. 13 is a block diagram illustrating a device that may be applied to STA or AP and may perform the present invention. As shown in FIG. 13, the device 100 includes a processor 101, a memory 102, a Radio Frequency (RF) unit 103, a display unit 104, and a user interface unit 105.

Layers of a physical interface protocol are performed by the processor 101. The processor 101 provides a control plane and a user plane. A function of each layer may be performed by the processor 101.

The memory 102 is electrically connected with the processor 101, and stores an operating system, an application program, and general files therein.

If the device 100 is a user equipment, the display unit 104 may display various kinds of information, and may be implemented using a liquid crystal display (LCD) and an organic light emitting diode (OLED) which are known. The user interface unit 105 may be configured by combination with a known user interface such as a keypad and a touch screen.

The RF unit 103 is electrically connected with the processor 101, and transmits or receives a radio signal. The RF unit 103 may include a transmission module and a reception module.

The transmission module may perform predetermined coding and modulation for signal and/or data which are scheduled from the processor 101 and will be transmitted to the outside, and then transfer the coded and modulated data to an antenna.

The reception module may perform decoding and demodulation for the radio signal externally received through the antenna, recover original data, and transfer the original data to the processor 101.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned embodiments of the present invention have been described based on the IEEE 802.11 system, they may equally be applied to various mobile communication systems in which an unlicensed device may be operated by acquiring available channel information.

The invention claimed is:

1. A method for receiving sensing results through a first station (STA) in a wireless local area network (LAN) system, the first station serving as an unlicensed device, which is allowed to operate in an available channel not being used by a licensed device at a TV white space (TVWS) band, the method comprising:
    transmitting a frame including a first element having information on a point when sensing is performed and a second element having a reporting sequence bitmap (RSM) that represents stations selected from a plurality of second stations to perform sensing and the sensing result report order of the selected stations to the plurality of second stations;
    receiving a measurement report frame, which includes a sensing result at the point when the sensing is performed, from each of the selected stations in accordance with the sensing result report order; and
    determining, using the measurement report frame, whether or not the licensed device is using a channel being used by the first station.

2. The method according to claim 1, further comprising transmitting a measurement request frame to the plurality of second stations to request additional sensing if it is difficult to determine whether the licensed device is using the channel used by the first station, by using the measurement report frame.

3. The method according to claim 2, wherein:
    the measurement request frame includes a measurement type field indicating a type of measurement request through the measurement request frame;
    the measurement type field is set to a value indicating that the measurement request frame is to request additional sensing; and
    a value of the measurement type field indicates that the type of measurement request is one of: a Basic request, a Clear channel assessment (CCA) request, a Receive power indication (RPI) histogram request, and an Additional in-band sensing request.

4. The method according to claim 1, further comprising allocating a reporting sequence bitmap index (RSM index) to each of the plurality of second stations, each of the second stations performing sensing if a bit corresponding to its reporting sequence bitmap index of the reporting sequence bitmap is set to 1.

5. The method according to claim 1, further comprising transmitting a frame indicating that a data period starts, to the plurality of second stations, if it is determined that the channel used by the first station is not used by the licensed device.

6. The method according to claim 1, further comprising transmitting a frame indicating that the channel used by the first station should be shifted to another channel, to the plurality of second stations, if it is determined that the channel used by the first station is used by the licensed device.

7. The method according to claim 1, wherein the measurement report frame includes information on a type of a signal which is detected.

8. The method according to claim 1, wherein the first element further includes information on a sensing period which is a time interval for performing sensing.

9. The method according to claim 8, wherein the sensing period is determined by the first station depending on a status of a network.

10. The method according to claim 1, further comprising:
    receiving information as to whether sensing will be performed regardless of a listen interval from some of the plurality of second stations, which are operating in a power save mode; and
    selecting stations of the plurality of second stations, which will perform sensing, by considering the received information.

11. A first station (STA) in a wireless local area network (LAN) system, the first station serving as an unlicensed device, which is allowed to operate in an available channel not being used by a licensed device at a TV white space (TVWS) band, the first station comprising:
    a transmission module transmitting a frame including a first element having information on a point when sensing is performed and a second element having a reporting sequence bitmap (RSM) that represents stations selected from a plurality of second stations to perform sensing and the sensing result report order of the selected stations to the plurality of second stations;
    a reception module receiving a measurement report frame, which includes a sensing result at the point when the sensing is performed, from each of the selected stations in accordance with the sensing result report order; and
    a processor determining, using the measurement report frame, whether or not the licensed device is using a channel being used by the first station.

12. The first station according to claim 11, wherein the first station transmits a measurement request frame to the plurality of second stations to request additional sensing if it is difficult to determine whether the licensed device is using the channel used by the first station, by using the measurement report frame.

13. The first station according to claim 12, wherein:
    the measurement request frame includes a measurement type field indicating a type of measurement request through the measurement request frame;
    the measurement type field of the measurement request frame is set to a value indicating that the measurement request frame is to request additional sensing; and
    a value of the measurement type field indicates that the type of measurement request is one of: a Basic request, a Clear channel assessment (CCA) request, a Receive power indication (RPI) histogram request, and an Additional in-band sensing request.

14. The first station according to claim 11, wherein the first station allocates a reporting sequence bitmap index (RSM index) to each of the plurality of second stations, each of the second stations performing sensing if a bit corresponding to its reporting sequence bitmap index from the reporting sequence bitmap is set to 1.

15. The first station according to claim 11, wherein the transmission module transmits a frame indicating that a data period starts, to the plurality of second stations, if it is determined that the channel used by the first station is not used by the licensed device.

16. The first station according to claim 11, wherein the transmission module transmits a frame indicating that the channel used by the first station should be shifted to another channel, to the plurality of second stations, if it is determined that the channel used by the first station is used by the licensed device.

17. The first station according to claim 11, wherein the measurement report frame includes information on a type of a signal which is detected.

18. The first station according to claim 11, wherein the first element further includes information on a sensing period which is a time interval for performing sensing.

19. The first station according to claim 18, wherein the sensing period is determined by the first station depending on a status of a network.

20. The first station according to claim 11, wherein the reception module receives information as to whether sensing will be performed regardless of its listen interval from some of the plurality of second stations, which are operating in a power save mode, and the processor selects stations of the plurality of second stations, which will perform sensing, by considering the received information.

* * * * *